H. T. CLARKE.
LIGHT FILTER.
APPLICATION FILED JULY 1, 1918.
1,293,039.
Patented Feb. 4, 1919.
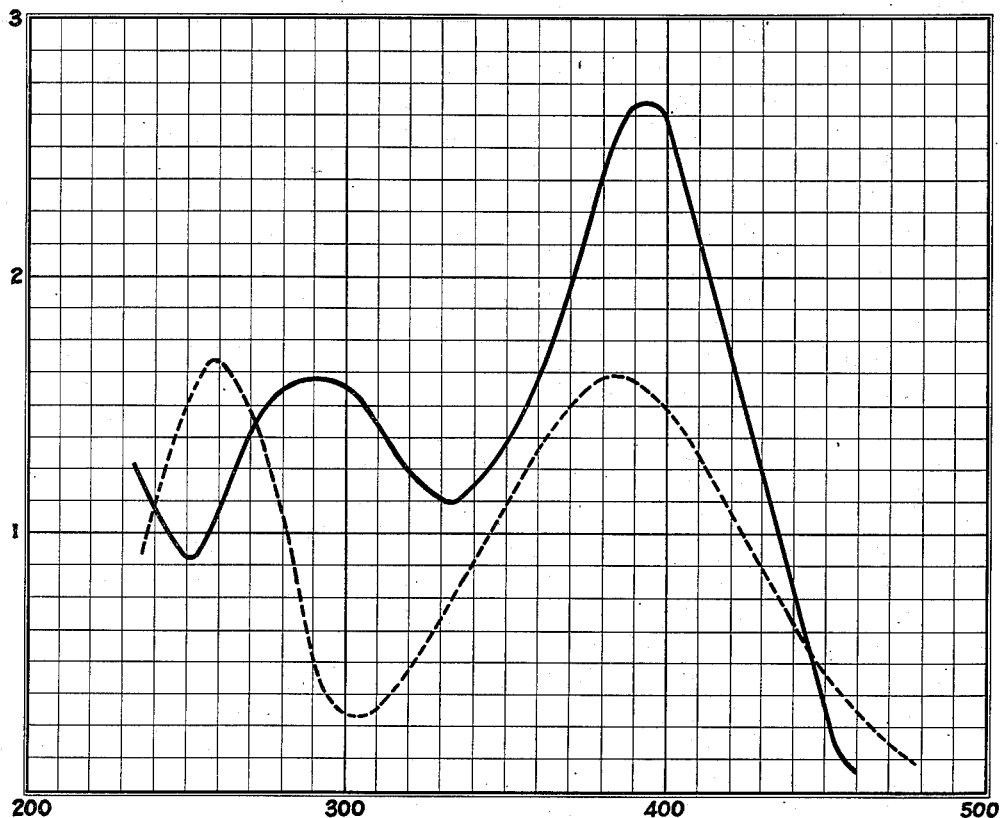
WITNESSES:
INVENTOR.
Hans T. Clarke,
BY
ATTORNEY.

UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

LIGHT-FILTER.

1,293,039.     Specification of Letters Patent.     Patented Feb. 4, 1919.

Application filed July 1, 1918. Serial No. 242,878.

*To all whom it may concern:*

Be it known that I, HANS T. CLARKE, a subject of the King of Great Britain, residing at Rochester, in the county of Monroe and State of New York, have invented certain new and useful Improvements in Light-Filters, of which the following is a full, clear, and exact specification.

This invention relates to light filters and more particularly to those having a relatively strong absorption for blue-violet and ultra-violet light.

One object of my invention is to produce filters which cut sharply in the blue-violet region of the spectrum or, in other words, have only small absorption for light of certain wave-lengths in the blue-violet region yet have a very strong absorption for light of only slightly different wave-lengths in that same region. Another object of my invention is to produce filters having a strong absorption for light in the ultra-violet region, which absorption is well sustained throughout the different wave-lengths in such region. A further object of my invention is to produce a photographic filter which will absorb light due to atmospheric haze without unnecessarily prolonging the exposure. Another object of my invention is to produce filters, which while having the above properties are resistant to fading. Further objects will hereinafter appear.

I have discovered that filters accomplishing these desired objects may be obtained by coloring light transmitting media with soluble salts of the acid derivatives of osazones. Since such filters are particularly useful in photographic work, I shall for purposes of illustration describe an application of my invention to that art, but it is not limited to that field except as indicated in the appended claims.

In the accompanying drawing the single figure is a diagram giving the absorption curve of a typical filter embodying my invention, together with a curve illustrating the prior art.

The soluble salts of the acid derivatives of osazones constitute a series of yellow dyes which upon spectroscopic test I have found to possess a sharp cut and strong absorption in the blue-violet region together with a strong, sustained absorption in the ultra-violet region. Such dyes have also proven to be stable or resistant to fading. Among these substances the glucose osazones are especially useful because of their ease of preparation and I shall, therefore, take for illustration a filter colored with the sodium salt of glucosephenylosazone-p-p'-dicarboxylic acid.

This substance may be prepared by warming an aqueous solution of glucose with p-hydrazinobenzoic acid until glucosephenylosazone-p-p'-dicarboxylic acid separates out. After purification this is converted into the yellow water-soluble sodium salt by treatment with sodium carbonate, such sodium salt being precipitated by adding alcohol in which it is substantially insoluble. During the reaction the proportions of the ingredients are not important but the glucose may conveniently be in excess.

The sodium salt thus obtained (purified by resolution and precipitation if desired) is then used to color the filter media. The latter may be any of the usual materials but colloids such as gelatin are very convenient to manipulate. For example, I may dissolve the dye in a water solution of gelatin and spread the same upon a glass surface, forming upon drying a film which may be stripped off and used alone or with any of the usual transparent supports. The proportion of dye and thickness of filter are varied according to the uses to which the filters are to be put. In photographic work they can be adjusted for the particular plates or films with which they are to be used and for the degree of absorption or correction required.

In the drawing I have shown in full lines the absorption curve of a column 20 millimeters thick of a water solution containing sodium glucosephenylosazone-p-p'-dicarboxylate in the proportion of one part in forty thousand. This strength is that of a weak filter but much stronger solutions of dye may be employed if greater absorption is desired, the salient features being retained in stronger filters. The dotted curve corresponds to a similarly proportioned solution containing the well known rapid filter yellow. The abscissæ represent wave-lengths expressed in millionths of a millimeter while the ordinates represent the amount of absorption expressed as "density", that is,— the logarithm of the opacity with respect to each particular wave-length. It will be seen that the new dye practically does not absorb light of wave length 460; but for only slightly shorter wave-lengths the absorption increases very rapidly, the curve being exceptionally steep between 460 and 390. In other words, the filter cuts sharply in this region of the spectrum. In the ultra-violet region the absorption is well sustained throughout, nowhere dropping below a strong value. By comparison of the full line and dotted line curves it will be seen that the new dye cuts much more sharply and more strongly than the other in the blue-violet and has a better sustained absorption in the ultra-violet. Moreover, these properties are maintained in use without material fading.

All of these properties are of importance in photographic work. Take for example the photography of distant objects through intervening atmosphere containing haze. The latter consists principally of scattered blue, violet and ultra-violet light from dust and vapor particles suspended in the air. As photographic plates and films (even color sensitive ones) are of maximum sensitiveness to light of such colors, the haze will be greatly exaggerated in the resulting picture and the details of distant objects will be obscured unless the haze-light be absorbed by a filter before it can reach the plate. If an old style filter be used which has a gradual instead of a sharp cut absorption and a poorly sustained instead of a well sustained absorption in the ultra-violet, the haze-light can only be absorbed by using a very dense filter which will absorb not only the haze-light but also part of the effective image-forming light of longer wave lengths. The exposure must consequently be unnecessarily prolonged, even on color sensitive plates. My new filter, however, permits the absorption of the haze-light without any material decrease in the useful light of longer wave lengths and consequently short exposures are permissible,—a prime requisite when the camera is rapidly moved, as in aerial work. Since my dyes are resistant to fading, filters for such work made therefrom will reliably retain their strength.

I claim:—

1. A light filter comprising light transmitting material containing a salt of an acid derivative of an osazone.

2. A light filter comprising light transmitting material containing a salt of an acid derivative of a glucoseosazone.

3. A light filter comprising light transmitting material containing a salt of glucosephenylosazone-p-p'-dicarboxylic acid.

4. A stable photographic filter having a sharp-cut absorption in the blue-violet region of the spectrum and a sustained absorption in the ultra-violet, comprising a sheet of gelatin colored with sodium glucosephenylosazone-p-p'-dicarboxylate.

Signed at Rochester, New York, this 22nd day of June, 1918.

HANS T. CLARKE.